United States Patent
Ramirez Corredores et al.

(10) Patent No.: US 8,628,589 B2
(45) Date of Patent: Jan. 14, 2014

(54) RENEWABLE HEATING OIL

(75) Inventors: Maria Magdalena Ramirez Corredores, Houston, TX (US); Vicente Sanchez, Houston, TX (US)

(73) Assignee: KiOR, Inc., Pasadena, TX (US)

( * ) Notice: Subject to any disclaimer, the term of this patent is extended or adjusted under 35 U.S.C. 154(b) by 196 days.

(21) Appl. No.: 13/025,483

(22) Filed: Feb. 11, 2011

(65) Prior Publication Data

US 2012/0204479 A1    Aug. 16, 2012

(51) Int. Cl.
*C10L 1/00* (2006.01)

(52) U.S. Cl.
USPC .......................................................... 44/307

(58) Field of Classification Search
USPC .......................................................... 44/307
See application file for complete search history.

(56) References Cited

U.S. PATENT DOCUMENTS

| | | | |
|---|---|---|---|
| 4,209,647 A | 6/1980 | Gallivan et al. | |
| 4,645,585 A | 2/1987 | White | |
| 5,820,640 A | 10/1998 | Ikura et al. | |
| 7,262,331 B2 | 8/2007 | Van de Beld et al. | |
| 7,279,018 B2 | 10/2007 | Jakkula et al. | |
| 7,425,657 B1 | 9/2008 | Elliott et al. | |
| 7,638,314 B2 | 12/2009 | Zappi et al. | |
| 2007/0261296 A1 | 11/2007 | Adams et al. | |
| 2008/0006520 A1 | 1/2008 | Badger et al. | |
| 2008/0312476 A1 | 12/2008 | McCall | |
| 2009/0065378 A1 | 3/2009 | Maas | |
| 2009/0166256 A1 | 7/2009 | Lewis et al. | |
| 2009/0227823 A1 | 9/2009 | Huber et al. | |
| 2009/0229173 A1 | 9/2009 | Gosling | |
| 2009/0250376 A1 | 10/2009 | Brandvold et al. | |
| 2009/0253947 A1 | 10/2009 | Brandvold et al. | |
| 2009/0253948 A1 | 10/2009 | McCall et al. | |
| 2009/0259082 A1 | 10/2009 | Deluga et al. | |
| 2009/0294324 A1 | 12/2009 | Brandvold et al. | |
| 2009/0301930 A1 | 12/2009 | Brandvold et al. | |
| 2009/0318737 A1 | 12/2009 | Luebke | |
| 2010/0212215 A1* | 8/2010 | Agblevor ........................ 44/300 |
| 2011/0138681 A1 | 6/2011 | Ramirez Corredores et al. | |

FOREIGN PATENT DOCUMENTS

| | | |
|---|---|---|
| EP | 0718392 | 9/1999 |
| EP | 1719811 | 11/2006 |
| EP | 2107100 | 10/2009 |
| KR | 100857247 B1 | 9/2008 |
| WO | 2006037368 | 4/2006 |
| WO | 2007128798 | 11/2007 |
| WO | 2007128800 | 11/2007 |
| WO | 2009014859 | 1/2009 |

(Continued)

OTHER PUBLICATIONS

Search Report and Written Opinion dated Sep. 25, 2012 for PCT Application No. PCT1US20121022945, Filed Jan. 27, 2012; Applicant: KiOR, Inc.; Title: Renewable Heating Oil.

(Continued)

*Primary Examiner* — Monique Cole
(74) *Attorney, Agent, or Firm* — Hovey Williams LLP

(57) ABSTRACT

More stable and valuable bio-oil produced from biomasses are provided. More specifically, more stable and valuable bio-oil useful as heating oil is provided. Particularly, various embodiments of the present invention provide for a bio-oil having sufficient heating value and stability to be useful as heating oil without the need to hydrotreat the bio-oil or use a similar deoxygenating process.

26 Claims, 3 Drawing Sheets

(56) References Cited

FOREIGN PATENT DOCUMENTS

Figure 1:
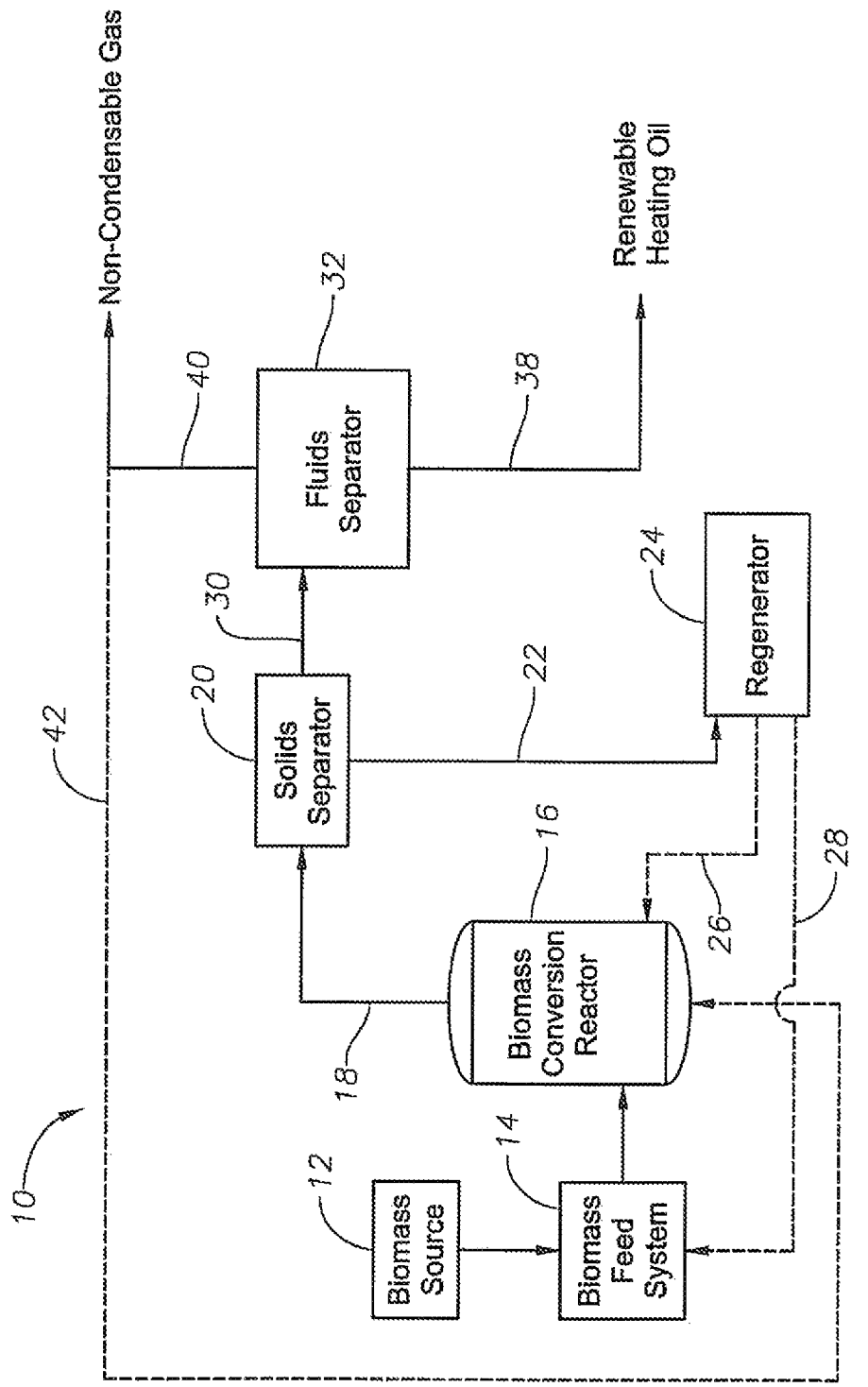

| WO | WO2009111026 | 9/2009 |
|---|---|---|
| WO | 2009126508 | 10/2009 |
| WO | 2010002792 | 1/2010 |
| WO | 2010008686 | 1/2010 |
| WO | 2010033512 | 3/2010 |
| WO | WO2010/088486 | 8/2010 |
| WO | WO2010/124069 | 10/2010 |

OTHER PUBLICATIONS

Hilten, et al "Comparison of Three Accelerated Aging Procedures to Assess Bio-Oil Stability" Fuel 89(2010), 2741-2749.

Ikura, et al "Emulsification of Pyrolysis Derived Bio-Oil in Diesel Fuel" Biomass & BioEnergy 24 (2003) 221-232.

Chiaramonti, et al "Development of Emulsions From Biomass Pyrolysis Liquid and Diesel and Their Use in Engines, Part 1: Emulsion Production" Biomass & BioEnergy 25 (2003) 85-99.

Qi, et al "Review of Biomass Pyrolysis Oil Properties and Upgrading Research", Energy Conversion & Management 48 (2007) 87-92.

Garcia-Perez, et al "Production and Fuel Properties of Fast Pyrolysis Oil/Bio-Diesel Blends" Fuel Processing Technology 91 (2010) 296-305.

Ringer, et al, "Large-Scale Pyrolysis Oil Production: A Technology Assessment and Economic Analysis" NREL Technical Report, NREL/TP-510-37779, Nov. 2006.

Czernik, et al "Stability of Wood Fast Pyrolysis Oil" Biomass and Bioenergy, vol. 7, Nos. 1-6, pp. 187-192, 1994, Great Britain.

Mahinpey, et al "Analysis of Bio-Oil, Biogas, and Biochar From Pressurized Pyrolysis of Wheat Straw Using a Tubular Reactor" Energy & Fuels 2009, 23 2736-2742.

Czernik, et al "Overview of Applications of Biomass Fast Pyrolysis Oil" Energy & Fuels 2004, 18, 590-598.

Oasmaa, et al, "Fast Pyrolysis of Forestry Residue, 3. Storage Stability of Liquid Fuel" Energy & Fuels 2003, 17, 1075-1084.

Diebold, "A Review of the Chemical and Physical Mechanisms of the Storage Stability of Fast Pyrolysis Bio-Oils" NREL/SR-570-27613, Jan. 2000.

Moens, et al. "Study of the Neutralization and Stabilization of a Mixed Hardwood Bio-Oil" Energy & Fuels 2009, 23, 2695-2699.

\* cited by examiner

RENEWABLE HEATING OIL

FIELD OF THE INVENTION

Embodiments of the present invention relate generally to more stable and valuable bio-oils made from biomasses, more specifically it relates to bio-oils that are useful as a heating oil. Particularly, various embodiments of the present invention provide for a bio-oil useful as heating oil without the need to hydrotreat the bio-oil or use a similar deoxygenating process.

BACKGROUND OF THE INVENTION

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and/or specialty chemicals. Existing biomass conversion processes include, for example, combustion, gasification, slow pyrolysis, fast pyrolysis, liquefaction, and enzymatic conversion. One of the useful products that may be derived from the aforementioned biomass conversion processes is a liquid product commonly referred to as "bio-oil." Bio-oil may be processed into transportation fuels, hydrocarbon chemicals, and/or specialty chemicals.

Despite recent advancements in biomass conversion processes, many of the existing biomass conversion processes produce low-quality bio-oils containing high amounts of oxygen, which are difficult, if not impossible, to separate into various fractions. These bio-oils require extensive secondary upgrading in order to be utilized as heating oils or heating fuels due to the high amounts of oxygen present in the bio-oil.

More specifically, the production of bio-oil by pyrolysis, both fast and slow, can be problematic. Pyrolysis is characterized by the thermal decomposition of materials in an oxygen-poor or oxygen-free atmosphere (i.e., significantly less oxygen than required for complete combustion). In the past, pyrolysis has referred to slow pyrolysis whose equilibrium products included non-reactive solids (char and ash), liquids (tar and/or pyroligneous liquor), and non-condensable gases.

More recently, it has been recognized that pyrolysis can be carried out through a fast (rapid or flash) pyrolysis method where finely divided feedstock is rapidly heated and the reaction time is kept short, i.e. on the order of seconds. Such fast pyrolysis results in high yields of primary, non-equilibrium liquids and gases (including valuable chemicals, chemical intermediates, hydrocarbon chemicals and bio-fuels).

The non-equilibrium liquids (or bio-oil) produced by fast pyrolysis are suitable as a fuel for clean, controlled combustion in boilers and for use in diesel and stationary turbines. In fact, such bio-oil liquids offer some distinctive advantages for heating and power production over biomass gasification products and direct combustion of the biomass. Some of the advantages of bio-oil are:
  Higher energy densities compared to direct combustion of the raw biomass;
  More easily/cost effective to transport and handle than raw biomass or producer gas;
  Existing boilers may be used with bio-oil, subject only to retrofitting;
  Fewer emissions in boiler use compared to solid fuels due to better control of the combustion process; and
  Bio-oil from pyrolysis processes is the least coat liquid bio-fuel for stationary use and its net $CO_2$-balance is better than that of other bio-fuels.

However, besides all those advantages, instability, corrosiveness and low heating value compared to conventional heating oil, have precluded a full success of pyrolysis bio-oils as a heating fuel. Moreover, it has been recognized that pyrolysis derived bio-oils are unsuitable for use as a heating oils and cannot be directly used as a heating oil without subsequent hydrotreating (see for example EP 0718392 and WO 2009/126508). In fact EP 0718392 notes that hydrotreating to completely remove oxygen from bio-oil would represent a major and prohibitive cost because of the high oxygen content of pyrolysis derived bio-oil.

Accordingly, it would be advantageous to develop a pyrolysis derived bio-oil that could be used as a heating oil wherein such bio-oil had improved stability, less corrosiveness and higher heating value than prior art bio-oils without having to undergo hydrotreating or other deoxygenating processes.

SUMMARY

In one embodiment of the present invention, there is provided a renewable heating oil composition derived from the thermochemical conversion of a cellulosic biomass wherein the renewable heating oil composition comprises hydrocarbons consisting of (a) an oxygenated component present in an amount such that the renewable heating oil composition has an oxygen content of less than about 30 weight percent, and (b) a non-oxygenated component having an aromatic content greater than about 40 weight percent.

In another embodiment of the present invention, there is provided a renewable heating oil composition derived from a cellulosic biomass wherein the renewable heating oil composition is produced by a process comprising: (a) converting at least a portion of the cellulosic biomass material in an oxygen-poor environment in the presence of a catalyst material at a temperature in the range of from about 200° C. to about 1000° C. to produce a reaction product stream containing the renewable heating oil composition; and (b) separating the renewable heating oil composition from the reaction product stream such that the heating oil composition has a heating value greater than about 10,000 btu/lb without an oxygen-removing hydrotreatment step, and wherein the renewable heating oil composition comprises mainly hydrocarbons and the hydrocarbons consist of (i) an oxygenated component present in an amount such that the renewable heating oil composition has an oxygen content of less than about 30 weight percent, and (ii) a non-oxygenated component having an aromatic content greater than about 40 weight percent.

BRIEF DESCRIPTION OF THE DRAWING FIGURES

Figure 2:
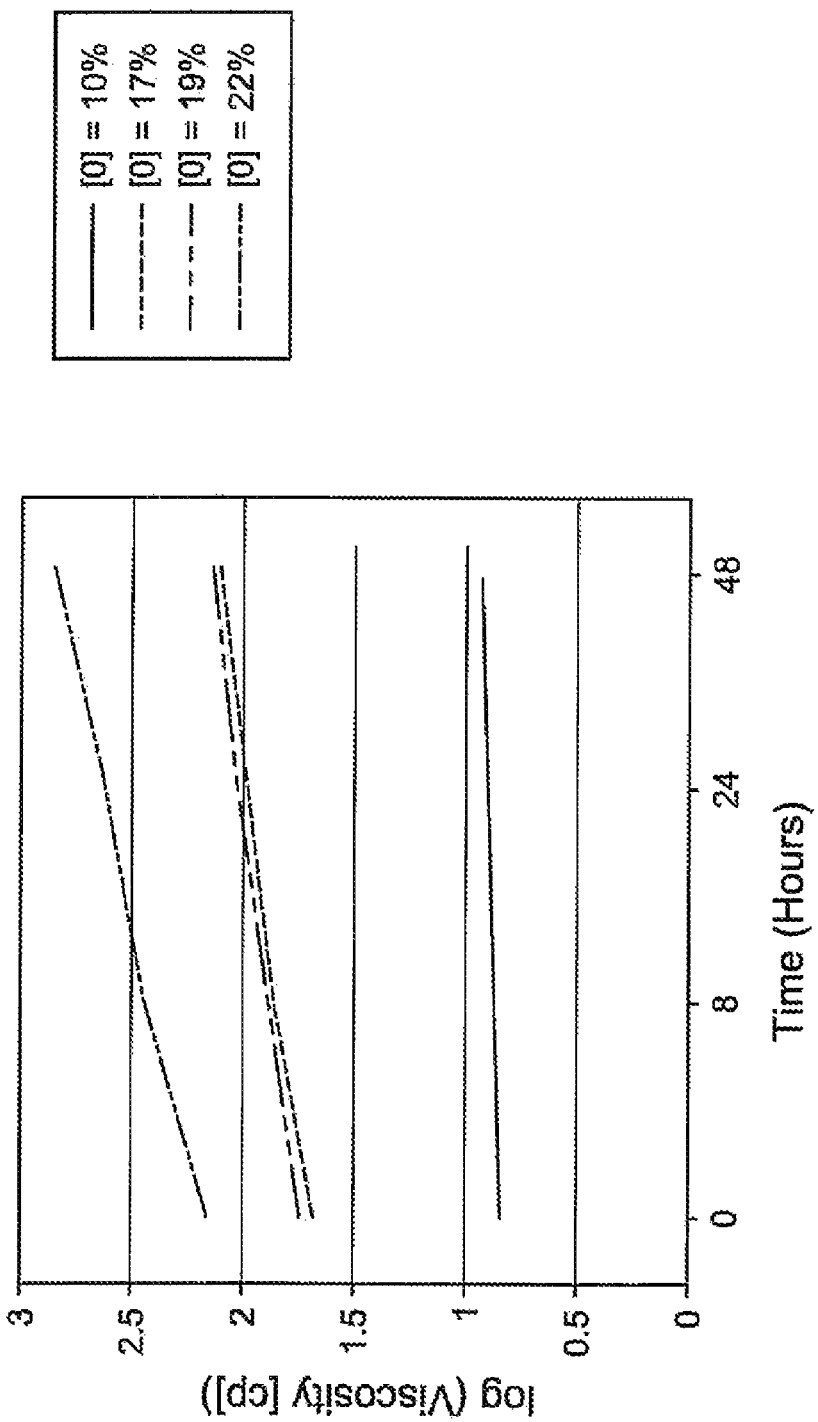
Figure 3:
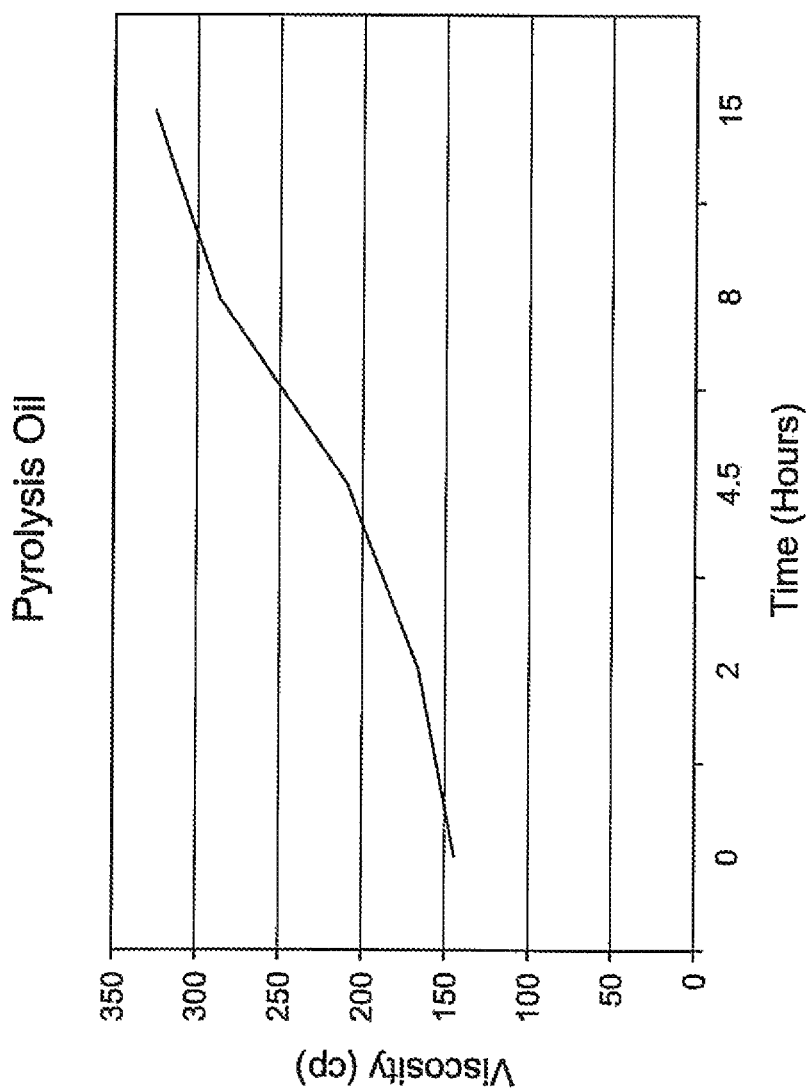

Embodiments of the present invention are described in detail below with reference to the attached figures, wherein:
FIG. 1 is a schematic diagram of a biomass conversion system according to one embodiment of the present invention.
FIG. 2 is graph illustrating the stability of bio-oil samples over time.
FIG. 3 is a graph illustrating data on the stability of pyrolysis oil at 90° C. taken from Table 2 of Czernik, S.; Johnson, D."

K. and Black, S. *Stability of wood fast pyrolysis oil*. Biomass and Bioenergy 1994. 7 (1-6), 187-192.

DETAILED DESCRIPTION

The following detailed description of various embodiments of the invention references FIG. 1, which illustrates a biomass conversion system suitable for use in producing renewable heating oil in accordance with the invention. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Pyrolysis as used herein refers to non-catalytic pyrolysis processes. Fast pyrolysis processes are pyrolysis processes for converting all or part of the biomass to bio-oil by heating the biomass in an oxygen-poor or oxygen-free atmosphere. The biomass is heated to pyrolysis temperature for a short time compared with conventional pyrolysis process, i.e. less than 10 seconds. Pyrolysis temperatures can be in the range of from about 200° C. to about 1000° C. Often the biomass will be heated in a reactor using an inert heat carrier, such as sand. As used above, the term "oxygen-poor" refers to an atmosphere containing less oxygen than ambient air. In general, the amount of oxygen should be such as to avoid combustion of the biomass material, or vaporized and gaseous products emanating from the biomass material, at the pyrolysis temperature. Preferably the atmosphere is essentially oxygen-free, that is, contains less than about 1 weight percent oxygen.

Biomass catalytic cracking (BCC) as used herein refers to a catalytic pyrolysis, wherein a catalyst is used to help facilitate cracking of the biomass components and compounds under fast pyrolysis type conditions. Accordingly, in a BCC process a catalyst is used in the reactor to facilitate the conversion of the biomass to bio-oil. The catalyst can be pre-mixed with the biomass before introduction into the reactor or be introduced into the reactor separately. If introduced into the reactor separately, a particulate catalyst can be used in place of all or part of the inert heat carrier.

The present invention is directed to bio-oil compositions having chemical and physical properties that are particularly suited for use as a heating oil or heating fuel in furnaces, boilers or stoves. In particular, the invention aims to define a renewable heating oil composition with increased stability, lower corrosiveness, and increased heating value as compared with pyrolysis oil. The bio-oil of the current invention is a renewable heating oil composition characterized by having a heating value greater than about 10,000 btu/lb. More preferably, the heating value will be above about 11,000 btu/lb and, generally, from about 11,000 btu to about 18,000 btu/lb or about 14,000 btu/lb to about 18,000 btu/lb. Additionally, the renewable heating oil composition of the current invention is characterized by being comprised of mainly hydrocarbons and the hydrocarbons consist of (i) an oxygenated component present in an amount such that the renewable heating oil composition has an oxygen content of less than about 30 weight percent, and (ii) a non-oxygenated component having an aromatic content greater than about 40 weight percent. Preferably, the oxygenated component is present in an amount such that the renewable heating oil composition has an oxygen content from about 5 weight percent to about 30 weight percent, more preferably, from about 6 weight percent to about 20 weight percent, and even more preferably from about 7 weight percent to about 15 weight percent. Preferably, the aromatic content of the non-oxygenated component will be from about 40 weight percent to about 60 weight percent. The oxygen content for the renewable heating oil composition indicated here in is on a dry basis; that is without including the oxygen content of any water present in the renewable heating oil composition.

The present invention can result in much more stable renewable heating oil compositions than the prior art. In certain embodiments, the renewable heating oil composition of the present invention will have a stability parameter less than 30 centipoise per hour (cp/h), and preferably no greater than 20 cp/h, no greater than 15 cp/h or no greater than 10 cp/h. The stability parameter characterizes the stability of a bio-oil over time. As used herein, the "stability parameter" of a bio-oil or renewable heating oil is defined as the slope of a best-fit straight line for a plot of bio-oil viscosity (centipoises) over time (hours), where the plotted viscosity values are of samples of the aged bio-oil at 40° C., the aging process is carried out at/// 90° C. and the samples are taken at the onset of aging (time=0 hours), 8 hours from the onset of aging, 24 hours from the onset of aging, and 48 hours from the onset of aging. Only data points exhibiting a correlation coefficient greater than 0.9 ($R^2 > 0.9$) are used to determine the stability parameter. Generally, low stability bio-oil has a stability parameter greater than 75 cp/h, intermediate-stability bio-oil has a stability parameter in the range of 30 to 75 cp/h and high-stability bio-oil has a stability parameter of less than 30 cp/h. Additionally, bio-oil with a stability parameter of less than 1 cp/h can be classified as ultra-stable bio-oil so that high-stability bio-oil is that with a stability parameter below 30 cp/h but at least 1 cp/h.

Production of the inventive renewable heating oil can be achieved by producing a bio-oil derived from a biomass that is converted in biomass catalytic cracking (BCC) process in accordance with the invention, particularly a BCC process using, a transport fluid bed reactor. Turning now to FIG. 1, it depicts a biomass conversion system 10 that is suitable for producing the renewable heating oil composition of the current invention. It should be understood that the biomass conversion system shown in FIG. 1 is just one example of a system within which the present invention can be embodied. The present invention may find application in a wide variety of other systems where it is desirable to efficiently and effectively convert a biomass into a renewable heating oil composition. The exemplary biomass conversion system illustrated in FIG. 1 will now be described in detail.

The biomass conversion system 10 of FIG. 1 includes a biomass source 12 for supplying a biomass feedstock to be converted to bio-oil. The biomass source 12 can be, for example, a hopper, storage bin, railcar, over-the-road trailer, or any other device that may hold or store biomass. The biomass supplied by the biomass source 12 can be in the form of solid particles. The biomass particles can be fibrous biomass materials comprising a cellulose-containing material (cellulosic material). Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice.

As depicted in FIG. 1, the solid biomass particles from the biomass source 12 can be supplied to a biomass feed system 14. The biomass feed system 14 can be any system capable of feeding solid particulate biomass to a biomass conversion reactor 16. While in the biomass feed system 14, the biomass material may undergo a number of pretreatments to facilitate the subsequent conversion reactions. Such pretreatments may include drying, roasting, torrefaction, demineralization, steam explosion, mechanical agitation, and/or any combination thereof.

In one embodiment, it may be desirable to combine the biomass with a catalyst in the biomass feed system 14 prior to introducing the biomass into the biomass conversion reactor 16. Alternatively, the catalyst may be introduced directly into the biomass conversion reactor 16. The catalyst maybe fresh and/or regenerated catalyst. The catalyst can, for example, comprise a solid acid, such as a zeolite. Examples of suitable zeolites include ZSA-5, Mordenite, Beta, Ferrierite, and zeolite-Y. Additionally, the catalyst may comprise a super acid. Examples of suitable super acids include sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

It should be noted that solid biomass materials generally contain minerals. It is recognized that some of these minerals, such as potassium carbonate, can have catalytic activity in the conversion of the biomass material. Even though these minerals are typically present during the chemical conversion taking place in the biomass conversion reactor 16, they are not considered catalysts.

The biomass feed system 14 introduces the biomass feedstock into a biomass conversion reactor 16. In the biomass conversion reactor 16, biomass is subjected to a thermochemical conversion reaction that produces bio-oil. The reactor 16 can be any system or device capable of thermochemically converting biomass to bio-oil. The biomass conversion reactor 16 can be, for example, a fluidized bed reactor, a cyclone reactor, an ablative reactor, or a riser reactor.

In one embodiment, the biomass conversion reactor 16 can be a riser reactor and the conversion reaction can be catalytic enhanced fast pyrolysis or biomass catalytic cracking (BCC). As discussed above, the BCC conversion should occur in an oxygen-poor or, preferably, oxygen-free atmosphere. In one embodiment, BCC is carried out in the presence of an inert gas, such as nitrogen, carbon dioxide, and/or steam. Alternatively, the BCC conversion can be carried out in the presence of a reducing gas, such as hydrogen, carbon monoxide, non-condensable gases recycled from the biomass conversion process, and/or any combination thereof.

The BCC conversion process is characterized by short residence times and rapid heating of the biomass feedstock. The residence times of the conversion can be, for example, less than 10 seconds, less than 5 seconds, or less than 2 seconds. The BCC conversion may occur at temperatures between 200 and 1,000° C., between 250 and 800° C., or between 300 and 600° C.

In a particularly preferred embodiment, the catalyst is used as a heat carrier material and introduced into reactor 16 via line 26 at sufficient temperature to insure that the reaction mixture reaches a temperature between 200 and 1,000° C., between 250 and 800° C., or between 300 and 600° C. In this embodiment, rapid, heating of the solid biomass material can generally be accomplished by providing the solid biomass material in the form of particles having a low mean particle diameter. Preferably, the mean particle diameter of the biomass is less than about 2000 μm, and more preferably less than about 1000 μm. The pretreatment of the biomass material can help achieve the desired particle size.

Referring again to FIG. 1, the conversion effluent 18 exiting the biomass conversion reactor 16 generally comprises gas, vapors, and solids. As used herein, the vapors produced during the conversion reaction may interchangeably be referred to as "bio-oil," which is the common name for the vapors when condensed into their liquid state. In the case of a BCC process, the solids in the conversion effluent 18 generally comprise particles of char, ash, and/or spent catalyst.

The bio-oil (contained in effluent 18) exiting the biomass conversion reactor 16 will be characterized by being comprised of mainly hydrocarbons and the hydrocarbons consist of (i) an oxygenated component present in an amount such that the renewable heating oil composition has an oxygen content of less than about 30 weight percent, and (ii) a non-oxygenated component having an aromatic content greater than about 40 weight percent. In other embodiments, the oxygenated component is present in an amount such that the renewable heating oil composition has an oxygen content (dry basis) of from about 5 weight percent to about 30 weight percent or, more preferably, from about 6 weight percent to about 20 weight percent, and even more preferably from about 7 to about 15 weight percent. In other embodiments, the aromatic content of the non-oxygenated component will be from about 40 weight percent to about 60 weight percent. It is a distinct advantage of the current invention that the bio-oil does not need to be treated with an oxygen removing process, such as hydrotreatment, to achieve the above composition. The cost associated with hydrotreatment process and the necessity to hydrotreat bio-oil before it is suitable for use as renewable heating oil renders pyrolysis bio-oils uneconomical for use as heating oil or heating fuel.

As depicted in FIG. 1, the conversion effluent 18 from the biomass conversion reactor 16 can be introduced into a solids separator 20. The solids separator 20 can be any conventional device capable of separating solids from gas and vapors such as, for example, a cyclone separator or a gas filter. The solids separator 20 removes a substantial portion of the solids (e.g., spent catalysts, char, and/or heat carrier solids) from the conversion effluent 18. The solid particles 22 recovered in the solids separator 20 can be introduced into a regenerator 24 for regeneration, typically by combustion. After regeneration, at least a portion of the hot regenerated solids can be introduced directly into the biomass conversion reactor 16 via line 26. Alternatively or additionally, the hot regenerated solids can be directed via line 28 to the biomass feed system 14 for combination with the biomass feedstock prior to introduction into the biomass conversion reactor 16.

The substantially solids-free fluid stream 30 exiting the solids separator 20 can then be introduced into a fluids separator 32. As mentioned above, it is preferred and an advantage of the current invention that the bio-oil 30 entering the fluids separator 32 has not previously been subjected to a deoxygenation process such as, for example, hydrotreating. Within fluids separator 32, non-condensable gas is separated from the bio-oil. The fluids separator 32 can be any system capable of separating the bio-oil contained in stream 30 from the non-condensable gas. Suitable systems to be used as the fluids separator 32 include, for example, systems for affecting separation by fractional distillation, heated distillation, extraction, membrane separation, partial condensation, and/or non-heated distillation. As shown in FIG. 1, non-condensable gases 40 removed from the fluids separator 32 may be, optionally, recycled via lines 40 and 42 to the biomass conversion reactor 16 for use as a lift gas.

As discussed above, the resulting renewable heating oil composition 38, is characterized by a heating value greater than about 10,000 btu/lb without further treatment to remove oxygen, such as in an oxygen-removing hydrotreatment process.

EXAMPLES

Example 1

Three bio-oil samples were produced from the conversion of yellow pine particles. Sample A was produced by biomass catalytic cracking using a clay-type catalyst in a riser reactor operated at a reactor outlet temperature of about 550° C. Samples B and C were produced by biomass catalytic cracking using a zeolite-type catalyst in a riser reactor operated at a reactor outlet temperature of about 600° C. The oxygen content and heating value of the bio-oil were determined by ASTM D5291 and ASTM D240 test methods, respectively. The results are shown in Table 1.

TABLE 1

|  | Sample A | Sample B | Sample C |
|---|---|---|---|
| Oxygen Content (% wt.) | 24 | 17 | 10 |
| Heating Value (btu/lb) | 11,261 | 13,727 | 15,156 |

For comparison, the heating value of typical pyrolysis bio-oils does not exceed 10,000 btu/lb as can be seen from a) Mahinpey, N.; Murugan, P.; Mani, T. and Raina, R. *Analysis of bio-oil, biogas, and biochar from pressurized pyrolysis of wheat straw using a tubular reactor*. Energy & Fuels 2009. 23 (5), 2736-2742; and b) Czernik, S. and Bridgwater, A. V. *Overview of applications of biomass fast pyrolysis oil*. Energy and Fuels 2004. 18 (2), 590-598.

Example 2

Stability was assessed for four samples of bio-oil based on changes in viscosity using an accelerated thermal stability test based on the observations of Czernik et al. as reported in Czernik, S.; Johnson, D. K. and Black, S. *Stability of wood fast pyrolysis oil*. Biomass and Bioenergy 1994. 7 (1-6), 187-192. Czernik et al. illustrates that viscosity changes for bio-oil stored 12 weeks at 37° C. corresponds to 6 hours at 90° C. and, hence, that viscosity changes for bio-oil stored 1 year at 37° C. corresponds to 24 hours at 90° C. The accelerated thermal stability test used for the inventive bio-oil samples in these examples comprised heating the samples to 90° C. and holding the samples at that temperature for 48 hours. Test amounts were taken from the samples at 0, 8, 24 and 48 hours and viscosity measurements were taken with the test amount temperature being at 40° C. Viscosity was measured using a modified version of ASTM D2983 using a higher temperature than standard due to the high viscosity of bio-oil at low temperature. Viscosity was measured at 40° C. using a Brookfield viscometer. As indicated above, the increase in viscosity under these conditions correlates with room temperature storage such that 24 hours of testing time at 90° C. is equal to the change in a year at near room temperature storage. The accelerated aging test correlates well with the chemical changes in the liquid, associated to polymerization or condensation reactions. (See also, Oasmaa, A. and Kuoppala, E. *Fast pyrolysis of forestry residue*. 3. *Storage stability of liquid fuel*. Energy and Fuels 2003, 17 (4), 1075-85.)

Four bio-oil samples, representative of the present invention, were produced from the conversion of yellow pine particles by biomass catalytic cracking using a zeolite-type catalyst in a riser reactor operated at a reactor outlet temperature of about 500 to 600° C. The results of the stability test are illustrated in FIG. 2. For comparison, as reported in Czernik et al., typical pyrolysis oils submitted to this accelerated thermal stability test have all shown a nearly 100% increase in viscosity after eight hours (see FIG. 3, which is a graphical representation of viscosity data for stored pyrolysis oil at 90° C. taken from Table 2 of Czernik et al.)

Example 3

Three additional bio-oil samples produced from southern yellow pine by biomass catalytic cracking using a zeolite-type catalyst in a riser reactor operated at a reactor outlet temperature of about 500 to 650° C. The three bio-oil samples were subjected to the accelerated thermal stability test in order to establish the effects of increased stability in the heat value of bio-oils. As shown in Table 2, ultra-stable bio-oils (bio-oils with a stability parameter of less than 1 cp/h) all exhibited low oxygen content and heating values greater than 10,000 btu/lb. Accordingly, the ultra-stable bio-oils all had superior heating value.

TABLE 2

| Sample | [O] (wt %) | Stability Parameter (cps/h) | Heating Value (btu/lb) |
|---|---|---|---|
| Sample 8 | 9 | 0.13 | 15200 |
| Sample 9 | 10 | 0.26 | 14939 |
| Sample 10 | 12 | 0.33 | 14500 |

Example 4

A corrosion test was performed according to general test procedures ASTM G31 on stainless steel, at two different temperatures for the liquid and vapor phases of heating bio-oil samples produced from southern yellow pine by biomass catalytic cracking using a zeolite-type catalyst in a riser reactor operated at a reactor outlet temperature of about 500 to 650° C. The samples contained 10 and 17% wt. oxygen, produced as in Example 1. No corrosion was detectable.

While the technology has been particularly shown and described with reference to specific embodiments, it should be understood by those skilled in the art that various changes in form and detail may be made without departing from the spirit and scope of the technology as defined by the appended claims.

As used herein, the term "an," "the," and "said" means one or more.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or elements recited after the term, where the element or elements listed after the transition term are not necessarily the only elements that make up of the subject.

As used herein, the terms "containing," "contains," and "contain" have the same open-ended meaning as "comprising," "comprises," and "comprise," provided below.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A renewable heating oil composition derived from the thermochemical conversion of a cellulosic biomass, wherein said renewable heating oil composition comprises hydrocarbons consisting of:
    (a) an oxygenated component present in an amount such that the renewable heating oil composition has an oxygen content from 6 weight percent to 15 weight percent, and
    (b) a non-oxygenated component having an aromatic content greater than about 40 weight percent,
    wherein said renewable heating oil composition has a heating value from 14,000 btu/lb to about 18,000 btu/lb.

2. The renewable heating oil composition of claim 1 wherein said oxygenated component is present in an amount such that said oxygen content of said renewable heating oil composition is from 7 to 15 weight percent.

3. The renewable heating oil composition of claim 1 wherein said aromatic content of said non-oxygenated component is from about 40 weight percent to about 60 weight percent.

4. The renewable heating oil composition of claim 1 wherein said cellulosic biomass is a lignocellulosic biomass.

5. The renewable heating oil composition of claim 1 wherein said renewable heating oil composition is used as a fuel for a furnace, boiler or stove.

6. The renewable heating oil composition of claim 1 wherein said renewable heating oil composition is produced from said thermochemical conversion without an oxygen-removing hydrotreatment step.

7. The renewable heating oil composition of claim 1 wherein said thermochemical conversion is in the presence of a catalyst.

8. The renewable heating oil composition of claim 1 having a stability parameter of less than 30 cp/h.

9. The renewable heating oil composition of claim 1 having a stability parameter of less than 15 cp/h.

10. The renewable heating oil composition of claim 1 having a stability parameter of less than 1 cp/h.

11. A renewable heating oil composition derived from the thermochemical conversion of a lignocellulosic biomass in the presence of a catalyst without an oxygen-removing hydrotreatment step, wherein said renewable heating oil composition comprises mainly hydrocarbons consisting of:
    (a) an oxygenated component present in an amount such that the renewable heating oil composition has an oxygen content from 7 weight percent to 15 weight percent, and
    (b) a non-oxygenated component having an aromatic content from about 40 weight percent to about 60 weight percent,
    wherein said oxygenated component and said non-oxygenated component are present in a proportion so as to render a heating value from 14,000 to about 18,000 btu/lb, and wherein said composition is used as a heating oil for a furnace, boiler or stove.

12. The renewable heating oil composition of claim 11 having a stability parameter of less than 30 cp/h.

13. The renewable heating oil composition of claim 11 having a stability parameter of less than 15 cp/h.

14. The renewable heating oil composition of claim 11 having a stability parameter of less than 1 cp/h.

15. A renewable heating oil composition derived from a cellulosic biomass wherein said renewable heating oil composition is produced by a process comprising:
    (a) converting at least a portion of said cellulosic biomass material in an oxygen-poor environment in the presence of a catalyst material at a temperature in the range of from about 200° C. to about 1000° C. to produce a reaction product stream containing said renewable heating oil composition; and
    (b) separating said renewable heating oil composition from said reaction product stream such that said heating oil composition has a heating value from 14,000 btu/lb to about 18,000 btu/lb, without an oxygen-removing hydrotreatment step, and wherein said renewable heating oil composition comprises hydrocarbons and said hydrocarbons consist of (i) an oxygenated component present in an amount such that the renewable heating oil composition has an oxygen content from 6 weight percent to 15 weight percent, and (ii) a non-oxygenated component having an aromatic content greater than about 40 weight percent.

16. The renewable heating oil composition of claim 15 wherein said cellulosic biomass is a lignocellulosic biomass.

17. The renewable heating oil composition of claim 15 wherein said oxygenated component is present in an amount such that said oxygen content of said renewable heating-oil composition is from 7 weight percent to 15 weight percent.

18. The renewable heating oil composition of claim 15 wherein said aromatic content of said non-oxygenated component is from about 40 weight percent to about 60 weight percent.

19. The renewable heating oil composition of claim 15 wherein the conversion of step (a) occurs in less than 10 seconds.

20. The renewable heating oil composition of claim 15 having a stability parameter of less than 30 cp/h.

21. The renewable heating oil composition of claim 15 having a stability parameter of less than 15 cp/h.

22. The renewable heating oil composition of claim 15 having a stability parameter of less than 1 cp/h.

23. A renewable heating oil composition derived from a lignocellulosic biomass wherein said renewable heating oil composition is produced by a process comprising:
    (a) converting in less than 10 seconds at least a portion of said lignocellulosic biomass material in an oxygen-poor environment in the presence of a catalyst material at a temperature in the range of from about 200° C. to about 1000° C. to produce a reaction product stream containing said renewable heating oil composition; and (b) separating said renewable heating oil composition from said reaction product stream such that said renewable heating oil composition has a heating value from 14,000 btu/lb to about 18,000 btu/lb, without an oxygen-removing hydrotreatment step, and wherein said renewable heating oil composition comprises hydrocarbons and said hydrocarbons consist of (i) an oxygenated component present in an amount such that said renewable heating oil composition has an oxygen content from 7 weight percent to 15 weight percent, and (ii) a non-oxygenated component having an aromatic content from about 40 weight percent to about 60 weight percent.

24. The renewable heating oil composition of claim 23 having a stability parameter of less than 30 cp/h.

25. The renewable heating oil composition of claim 23 having a stability parameter of less than 15 cp/h.

26. The renewable heating oil composition of claim 23 having a stability parameter of less than 1 cp/h.

\* \* \* \* \*